United States Patent [19]
Barone

[11] Patent Number: 5,472,252
[45] Date of Patent: Dec. 5, 1995

[54] SNOW SHOVEL WITH ADJUSTABLE SECOND HANDLE

[76] Inventor: Frank A. Barone, 750 Legion Ave., New Haven, Conn. 06519

[21] Appl. No.: 265,862

[22] Filed: Jun. 27, 1994

[51] Int. Cl.⁶ .................................. 0547 1/22; B25G 3/00
[52] U.S. Cl. .................................. 294/58; 294/54.5
[58] Field of Search .................... 294/54.5, 57–59, 294/137, 149, 152, 153, 156, 170; 15/143.1, 144.1, 145; 16/110 R, 114 R, 124, 125

[56] References Cited

U.S. PATENT DOCUMENTS

| | | | |
|---|---|---|---|
| 875,504 | 12/1907 | Clark | 294/58 |
| 1,449,702 | 3/1923 | Sizemore | 294/58 X |
| 2,416,414 | 2/1947 | Spencer | 294/58 |
| 2,521,441 | 9/1950 | Bickley | 294/58 |
| 3,082,554 | 3/1963 | Steeb | 294/58 X |
| 4,103,954 | 8/1978 | Vaslas | 294/54.5 |
| 4,772,057 | 9/1988 | Harvey | 294/58 |

FOREIGN PATENT DOCUMENTS

| | | | |
|---|---|---|---|
| 1041062 | 10/1953 | France | 294/59 |
| 1323239 | 2/1963 | France | 294/58 |
| 1446837 | 6/1966 | France | 294/58 |
| 2546363 | 11/1984 | France | 294/58 |
| 129328 | 7/1985 | Japan | 294/58 |
| 146927 | 7/1986 | Japan | 294/58 |
| 1533014 | 11/1978 | United Kingdom | 294/58 |
| 2117615 | 10/1983 | United Kingdom | 294/58 |
| 2156641 | 10/1985 | United Kingdom | 294/58 |

*Primary Examiner*—Johnny D. Cherry
*Attorney, Agent, or Firm*—O. Pal Asija

[57] ABSTRACT

The snow shovel of this invention comprises a second handle which may be integrated into OEM (Original Equipment Manufacturer) shovels or marketed as a kit to the DIY (Do It Yourself) consumer for adding into existing shovels. The purpose of adding the second handle is to reduce the pressure on the back of the user and hence the name BACK EZE™ for the shovel. The handle specifically comprises a hollow tube through which a single rope passes twice (same direction both times) criss-crossing through the handle. The ends of the rope are tied to top extremities of the shovel. The middle of the rope is clove hitched to the long handlebar/stem of the shovel.

5 Claims, 4 Drawing Sheets

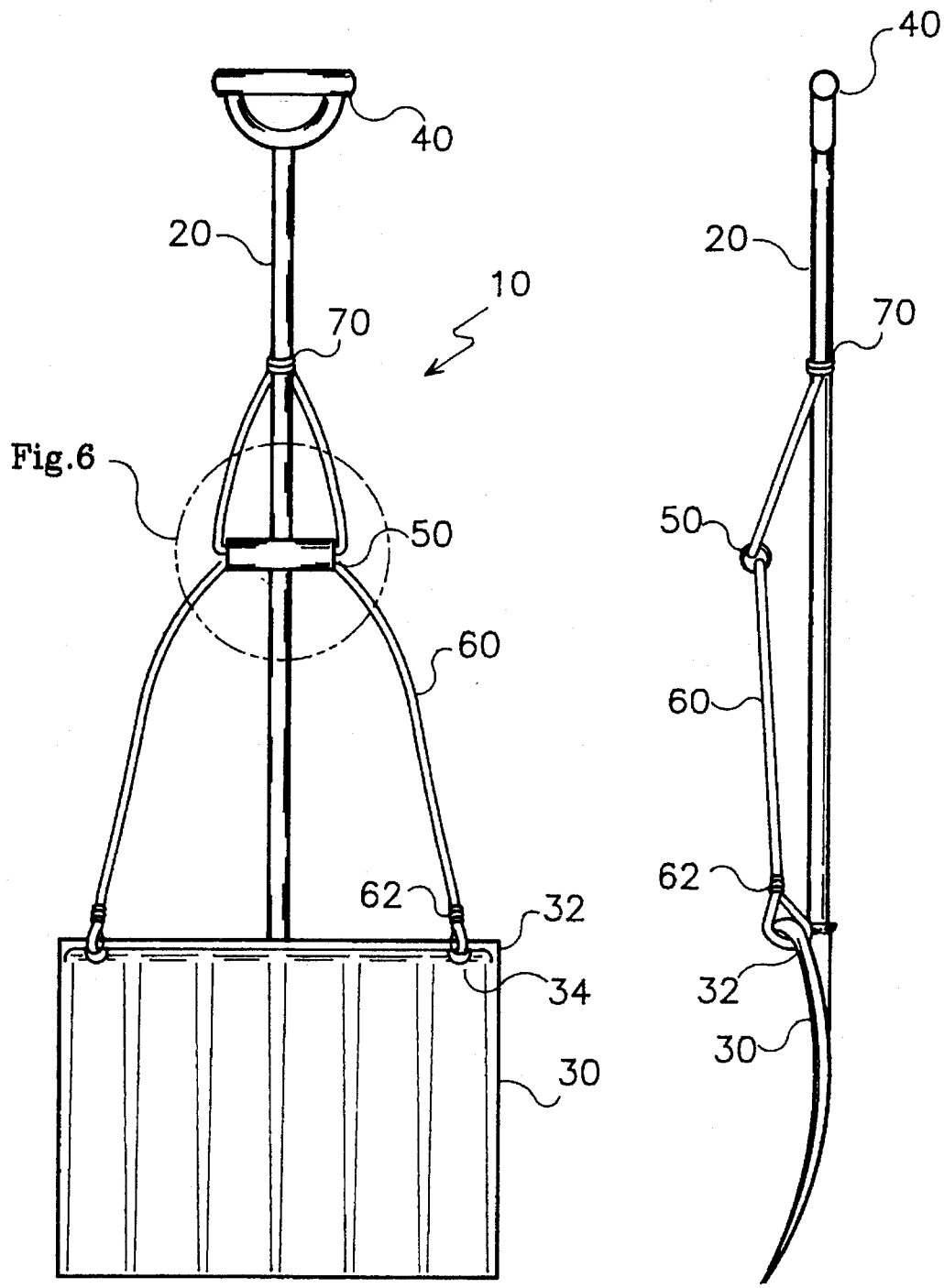

SNOW SHOVEL WITH ADJUSTABLE SECOND HANDLE

SUMMARY

This invention relates to an improvement in snow shovels. The improvement comprises adding a simple second handle to the snow shovel. This second handle may be integrated into OEM (Original Equipment Manufacturer) shovels or marketed as a kit to the DIY (Do It Yourself) consumer for adding into existing shovels. The purpose of adding the second handle is to reduce the pressure on the back of the user and hence the name BACK EZE™ for the shovel. The handle specifically comprises a hollow tube through which a single rope passes twice (same direction both times) cries-crossing through the handle. The ends of the rope are tied to top extremities of the shovel. The middle of the rope is clove hitched to the long handlebar or stem of the shovel. Thus the rope is tied to one top end of the shovel, passed through the hollow handle, clove-hitched to the existing handle-bar/stem and is again passed through the hollow handle with same orientation and same direction as before and fixed to the other top corner of the shovel. The position of the clove hitch on the stem of the shovel and the position of the second handle in the 3D (Dimensional) space is easily and quickly adjusted by the user.

PRIOR ART

A preliminary prior art search was conducted and furthermore the inventor is intimately familiar with the problem and the prior art. Following U.S. and foreign patents are typical examples of the prior art attempting to reduce pressure on the back by adding a second handle. For the convenience of the reader these patents are arranged in the reverse chronological order.

a) U.S. Pat. No. 4,944,541 granted to Kenneth Waldschmidt on Jul. 31, 1990 for "Two-handled shovel"

b) U.S. Pat. No. 4,787,661 granted to Thomas Rutledge on Nov. 29, 1988 for adjustable double handled shovel.

c) U.S. Pat. No. 4,531,713 granted to Francis Balboni on Jul. 30, 1985 for "Snow Removal Implement"

d) Japanese Patent 61-146927(A) granted to Takeshi Irisawa on Jul. 4, 1986 for "Slewing Type Rope Grip"

e) Japanese Patent 61-28631 granted to Takeshi Irisawa on Feb. 8, 1986 for "Shovel with Lever"

f) U.S. Pat. No. 4,103,954 granted to John Vaslas on Aug. 1, 1978 for "Snow Shovel"

g) French Patent 1,323,239 granted to M. Fortrat on May 8, 1962 for "Accessory for the Spade"

h) U.S. Pat. No. 827,542 granted to Richard Lawson on Jul. 31, 1906 for "Combined Lawn Rake and Snow Scoop"

A brief discussion including relevance of each of the above references follows.

1) The U.S. Pat. No. 4,944,541 discloses an alternative design for a two handled shovel in which an auxiliary grip handle is attached via a short shaft to an adjustable location along the main handle shaft. Both handles are parallel to the blade of the shovel.

2) U.S. Pat. No. 4,787,661 shows an adjustable double handled shovel in which both handles are composed of telescopically mated sections so that their length may be independently adjusted. A cross bar connects the handles together for added strength. One of the handles may be positioned either parallel to or perpendicular to the blade of the shovel.

3) U.S. Pat. No. 4,531,713 is cited here to show the use of the rope 48 in conjunction with an improved snow shovel having a cross-bar portion for manipulation of the implement.

4) Japanese Patent 61-146927 discloses an adjustable rope grip for snow shovel. The grip is secured to the shovel with a rope 2 attached to Joint A on a coupling structure comprising elements 7, 13, and 18. The other end of the rope 2 is secured to handle 1. The grip can be turned parallel to the shovel blade.

5) Japanese Patent 61-28631 discloses another embodiment of a snow shovel with a second handle attached via a rope to a lever projecting from the top of the blade of the shovel.

6) U.S. Pat. No. 4,103,954 discloses a snow shovel having an auxiliary handle attachment comprising handle 45, cross base bar 46 and main handle rod 30. Two auxiliary handle rods 39 and 40 connect handle 45 to scoop 21. The main handle and the second handle are parallel to the scoop blade 21 and the location of the second handle is adjustable.

7) French Patent 1,323,239 discloses accessories for a spade which include a second handle attached at the base of the spade.

8) U.S. Pat. No. 897,542 shows an adjustable combination rake and snow scoop only tangentially related to the applicant's invention.

Unfortunately none of the prior art devices singly or even in combination meet all of the objectives established by the inventor for the improved BACK EZE® Snow Shovel of this invention.

OBJECTIVES

1. It is an objective of this invention to provide a simple low cost shovel that is easy on the back of the user.

2. Another objective of this invention is that it reduces the pressure on the back of the user by incorporating a second handle.

3. Another objective of this invention is to provide a second handle that is easily and quickly adjustable in 3-D space.

4. Another objective of this invention is to anchor the second handle via a criss-crossing single rope through the second handle onto the conventional shaft of the snow shovel by using a slidable clove hitch.

5. Another objective of the BACK EZE™ shovel of this invention is to provide a snow shovel that is virtually indestructible.

6. Another objective of this invention is to provide a Snow Shovel that is light weight, rigid and affordable if not down right cheap.

7. Another objective of this invention is that it be easily incorporate-able into OEM shovels and marketable as a kit for the DIY consumer.

8. Another objective of this invention is that it be environmentally safe.

9. Another objective of this invention is that it be physically safe, environmentally safe, noise free and consume little or no energy.

10. Another objective of this invention is that it be easy to use, even intuitive, even for novices or first time users.

11. Another objective of this invention is that it meet all federal, state, local and other private standards, guidelines, regulations and recommendations with respect to safety, environment, energy consumption.

12. Another objective of this invention is that it be ergonomically designed to avoid any ill side effects on the health of the operator.

13. Another objective of this invention is that it be self contained complete with instructions.

14. Other objectives of this invention reside in its simplicity, elegance of design, ease of manufacture, service and use and even aesthetics as will become apparent from the following brief description of the drawings and the detailed description of the preferred embodiment.

BRIEF DESCRIPTION OF THE DRAWING

The objects, features and advantages of the present invention and its application will be more readily appreciated when read in conjunction with the accompanying drawing, in which:

a) FIG. 1 is a front plan view of the BACK EZE™ snow shovel of this invention.

b) FIG. 2 is top elevation thereof.

c) FIG. 3 is side elevation thereof.

DETAILED DESCRIPTION OF THE PREFERRED EMBODIMENT

Figure 4:
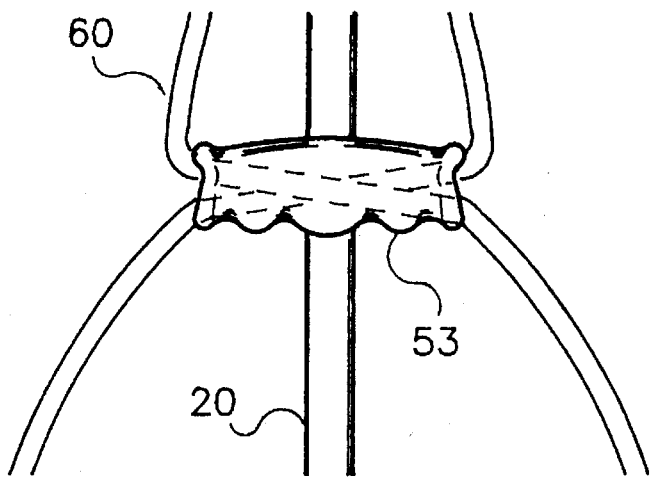
FIG. 4 is a detailed close up view of the second handle used in the preferred embodiment of the BACK EZE™ shovel of this invention.

As shown in the drawings wherein like numerals represent like parts throughout the several views, there is generally disclosed an improved BACK EZE™ Snow shovel 10 having a shaft 20, blade 30 and a first handle 40. The improvement comprises adding a simple second handle 50 to the snow shovel 10 through a single rope 60.

Figure 5:
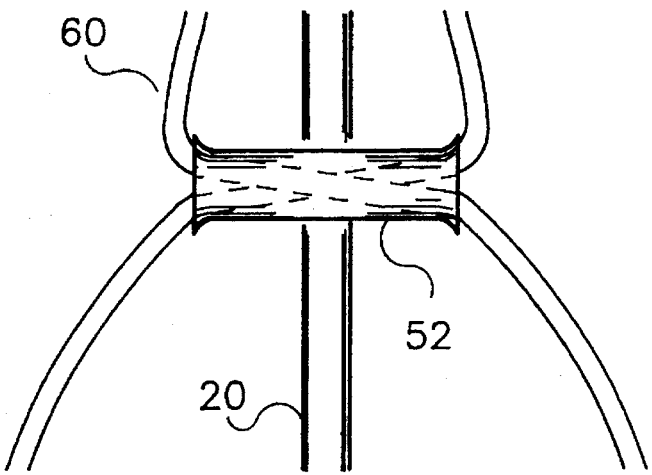
FIG. 5 is a detailed close up view of the second handle used in an alternate embodiment of the BACK EZE™ shovel of this invention.

Flared grip 52 of FIG. 5 and finger grip 53 of FIG. 4 are two alternate embodiments of the handle 50. This second handle 50 may be integrated into OEM (Original Equipment Manufacturer) shovels or marketed as a kit to the DIY (Do It Yourself) consumer for adding into existing shovels 10. The purpose of adding the second handle 50 is to reduce the pressure on the back of the user and hence the name BACK EZE™ for the shovel.

The second handle 50, 52 or 53 specifically comprises a hollow tube through which a single rope 60 passes twice (same direction both times) criss-crossing through the second handle hollow tube. The ends 62 of the rope 60 are tied to top extremities of the shovel blade. The middle of the rope 60 is clove hitched at 70 to the shaft 20 of the shovel.

Thus the rope 60 is tied to one top end 32 of shovel 30, through holes 34 at the top corners, passed through the hollow handle 50, 52, 53, clove-hitched to the existing shaft 20 and is again passed through the hollow handle 50, 52, 53 with same orientation and same direction as before and fixed to the other top corner 32 of the shovel 10.

The criss-crossing of the rope in the second handle 50, 52, 53 is achieved automatically by passing the single rope 60 twice through the second handle 50, 52, 53 in the same direction both times. The position of the clove hitch 70 on the shaft 20 of the shovel and the position of the second handle 50, 52, 53 in the 3D (Dimensional) space is easily and quickly adjusted by the user. Alternatively the rope 60 may be looped around first handle 40 instead of clove hitch interface to shaft 20. This interface 42 is shown in FIGS. 8 and 9.

Figure 6:
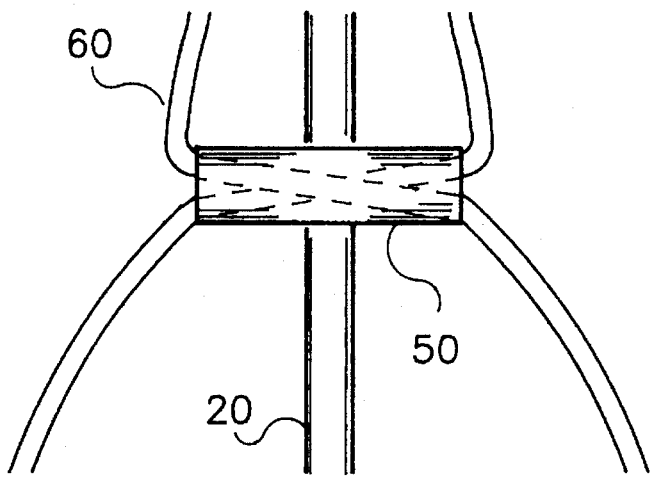
FIG. 6 is a detailed close up view of the second handle used in yet another alternate embodiment of the BACK EZE™ shovel of this invention.

FIGS. 4, 5 and 6 show detailed close up views of the second handle 50 used in the preferred embodiment and two other alternate embodiments of the BACK EZE™ shovel of this invention.

Figure 7:
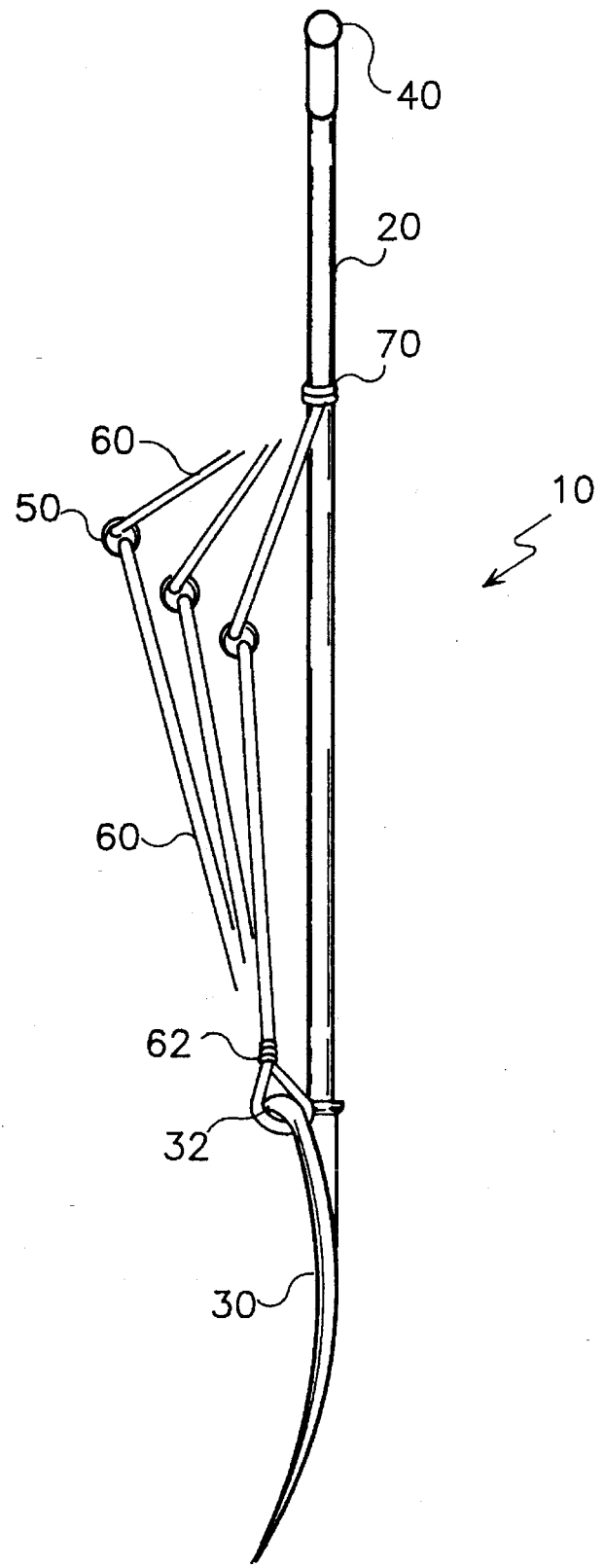
FIG. 7 is a side view of the BACK EZE™ shovel of this invention with the second adjustable handle shown in three different positions.

FIG. 7 shows in side elevation the adjustable nature of the second adjustable handle 50 in three different positions.

Figures 8, 9:
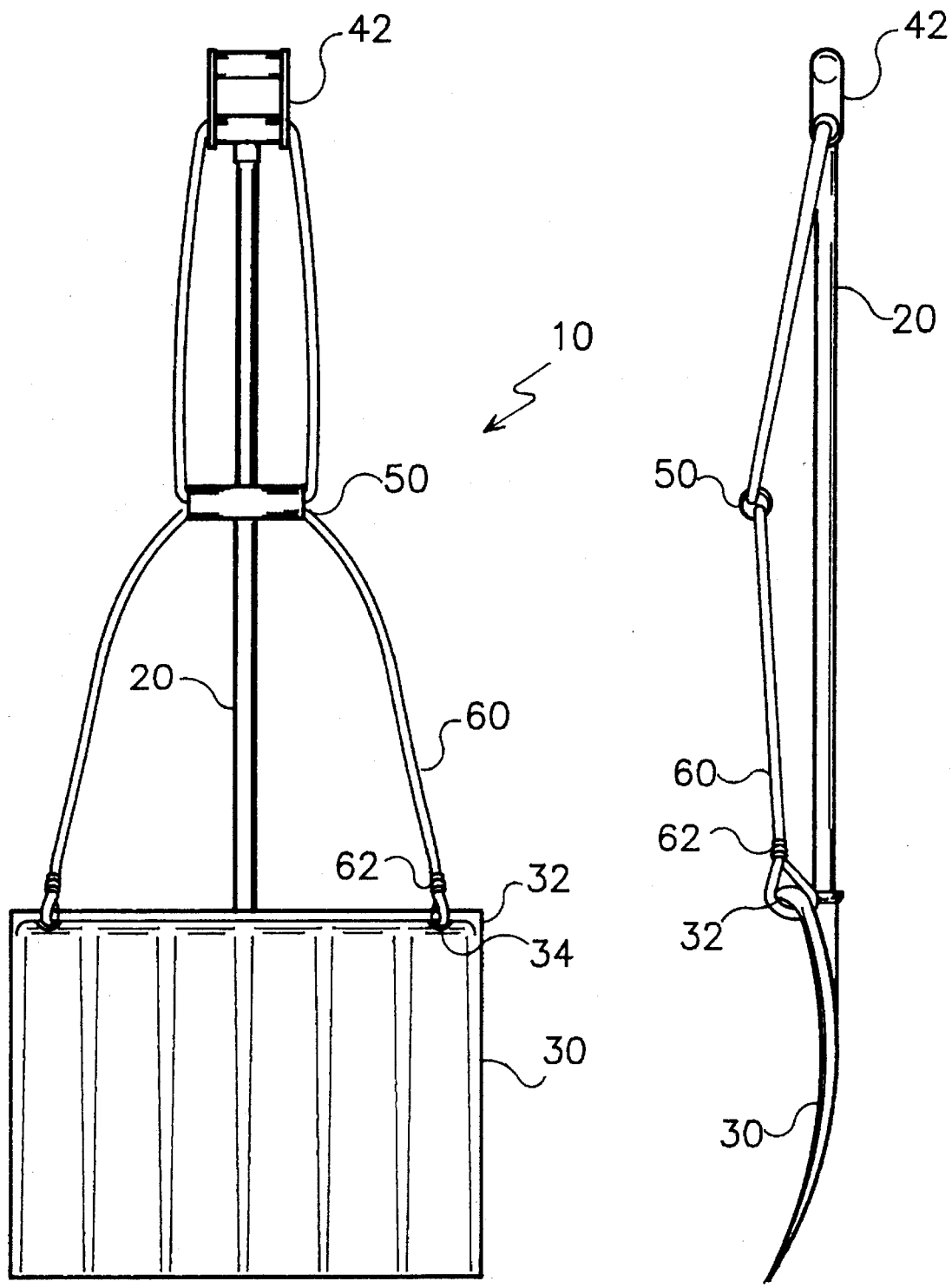
FIG. 8 shows front plan view of an alternate embodiment of the BACK EZE™ shovel of this invention.
FIG. 9 is a side elevation of the alternate embodiment shown in FIG. 8 of the BACK EZE™ shovel of this invention.

FIGS. 8 and 9 show front and side views of an alternate embodiment.

OPERATION

The use and the operation of this invention is intuitive. One employs one hand on the conventional handle 40 and the second hand on the second handle 50 provided by this inventor. The shovel is then used normally to shovel snow or other matter.

The inventor has given a non-limiting description of the concept. Many changes may be made to this design without deviating from the spirit of the concept of this invention. Examples of such contemplated variations include the following.

a) The invention may be combined with other functions which complement each other with or without synergism, such as raking leaves, shoveling dirt or the like functions.

b) The system may be adapted for other related uses tangentially or remotely connected with construction but where reduced pressure on the back of the user is desirable.

c) A different type of second handle may be employed and attached to the shaft by different method.

d) Instead of single criss-crossing rope through the second handle, two lengths of ropes may be used.

Other changes such as aesthetic and substitution of newer materials as they become available which substantially perform the same function in substantially the same way with substantially the same result without deviating from the spirit of this invention may be made.

Following is a listing of the components used in this embodiment arranged in ascending order of the reference numerals for ready reference of the reader.

10=Adjustable Dual handle snow shovel of this invention generally

20=Shaft of the snow shovel 10

30=Blade of snow shovel 10

32=Top corners of shovel blade

34=Hole in top corner of shovel blade

40=First handle

42=Alternate interface between rope 60 and first handle 40 of shovel 10

50=Second handle
52=Flare handle embodiment
53=Handle embodiment with hand grip
60=Single contiguous piece of rope
62=Ends of the rope
70=Clove hitch interface between rope 60 and shaft While this invention has been described with reference to illustrative embodiments, this description is not intended to be construed in a limiting sense. Various modifications and combinations of the illustrative embodiments as well as other embodiments of the invention will be apparent to persons skilled in the art upon reference to this description. It is therefore contemplated that the appended claims cover any such modifications, and/or embodiments that fall within the true scope of the invention.

The inventor claims:

1. A shovel with an adjustable second handle comprising:
   a) a shaft having a top end and a bottom end;
   b) a blade, having a top end and a bottom end, connected to said shaft at said shaft bottom end;
   c) a first handle connected to said shaft at said shaft top end; and
   d) a second handle connected to said shaft and said blade through a single rope; and wherein further:
   e) said second handle is of hollow tubular shape;
   f) said rope is fastened to said blade at said top end of said blade; and
   g) said rope criss-crosses in said hollow handle.

2. The shovel with an adjustable second handle of claim 1 wherein the middle of said rope is attached to said shaft in a clove hitch knot.

3. The shovel with an adjustable second handle of claim 2 wherein crisscrossing of said rope is achieved by passing said single rope twice through said hollow handle in the same direction with the same orientation each time.

4. The process of converting a shovel having a blade and a shaft into a shovel with an adjustable second handle comprising the steps of:
   a) fastening one end of a rope to a top corner of said blade;
   c) passing said rope through a hollow tubular handle;
   d) clove hitching said rope onto said shaft;
   e) passing said rope through said handle a second time in the same direction with the same orientation as in step c) supra; and
   f) fastening the other end of said rope to the other top corner of said blade.

5. The process of converting a shovel into a shovel with an adjustable second handle of claim 4 wherein further said fastening of said rope to said corners of said blade is via a hole in each said top corner.

* * * * *